455-617 AU 233 EX
FIP8106 XR 4,209,767

United States Patent [19]

Flanders

[11] 4,209,767

[45] Jun. 24, 1980

[54] ACOUSTO-OPTIC COUPLER FOR GLIDE SLOPE CONTROL SYSTEMS

[75] Inventor: David R. Flanders, Pottstown, Pa.

[73] Assignee: The United States of America as represented by the Secretary of the Navy, Washington, D.C.

[21] Appl. No.: 773,883

[22] Filed: Mar. 3, 1977

[51] Int. Cl.[2] .......................... G08G 5/00; H04B 9/00

[52] U.S. Cl. ....................................... 340/26; 455/617

[58] Field of Search ............ 340/26, 27 NA; 250/199, 250/206, 555, 556, 215; 356/141, 152, 4

[56] References Cited

U.S. PATENT DOCUMENTS

| | | | |
|---|---|---|---|
| 2,316,751 | 4/1943 | Adler | 340/27 NA |
| 3,243,592 | 3/1966 | Tomiyasu et al. | 250/199 |
| 3,622,791 | 11/1971 | Bernard | 250/199 |
| 3,657,543 | 4/1972 | Rose | 250/199 |
| 3,705,955 | 12/1972 | Assouline et al. | 340/26 |
| 3,736,061 | 5/1973 | Knowlden et al. | 356/141 |
| 3,802,780 | 4/1974 | Helm et al. | 340/26 |

*Primary Examiner*—John W. Caldwell, Sr.
*Assistant Examiner*—James J. Groody
*Attorney, Agent, or Firm*—R. S. Sciascia; Henry Hansen; William J. Iseman

[57] ABSTRACT

An acousto-optic coupler for enhancing safety and control of glide slope direction between approaching aircraft and carrier landing facilities. Aircraft engine noise is mechanically coupled through the airframe to modulate light beam signals generated by an aircraft landing light. An optical receiver on board the carrier receives the modulated light beam which is detected, filtered and amplified to produce an output signal from an acoustic transducer. The acoustic output signal is monitored by landing personnel for changes in engine noise responsive to carrier originated commands for glide slope control.

11 Claims, 2 Drawing Figures

ACOUSTO-OPTIC COUPLER FOR GLIDE SLOPE CONTROL SYSTEMS

STATEMENT OF GOVERNMENT INTEREST

The invention described herein may be manufactured and used by or for the Government of the United States of America for government purposes without the payment of any royalties thereon or therefor.

BACKGROUND OF THE INVENTION

This invention relates generally to aircraft glide slope control apparatus and particularly to an acousto-optic communication system between an approaching aircraft and base landing facilities such as an aircraft carrier for enhancing the control and safety of aircraft landings.

Successful aircraft landings, particularly those maneuvers involving a landing between an approaching aircraft and a seagoing landing facility such as an aircraft carrier, necessitate the highest degree of safety and control in order to insure maximum protection for personnel and equipment. The control and guidance of an aircraft approaching a carrier is generally assisted by a landing signal officer (LSO) placed on the carrier deck and who has both visual and radio contact with the approaching aircraft. Upon approaching the carrier, the oncoming aircraft begins to assume a predetermined glide slope pattern which defines the path along which the approaching aircraft can most safely and accurately land on the carrier deck. The pilot of the aircraft receives glide slope correction information such as engine power level, altitude and turning commands from the LSO aboard the carrier during the time the aircraft is in the glide slope path. Historically, radio communications between the pilot and the LSO have provided the basic method for communicating glide slope commands between the carrier and aircraft. One important operating parameter indicative of a proper response to a pilot initiated directive is the engine noise produced by the aircraft compressor or pistons and the deviations in levels of the noise as sensed by the pilot in response to the control change. These changes in engine noise are continuously monitored by the pilot because of the pilot's proximity to the source of the noise and thus provide an added degree of confidence to the pilot in confirming engine response to pilot command. The benefit of this in-built aircraft performance monitoring system, however, is not available to the LSO positioned on the carrier deck some distance from the approaching aircraft. The capability of monitoring engine noise as an acoustic sensation would enable the landing signal officer to sense the power level and pitch of the aircraft engine thereby to confirm if the engine is properly responding to glide slope signals communicated from the LSO to the pilot and thus add an additional measure of safety and accuracy to successful aircraft carrier landings.

SUMMARY OF THE INVENTION

Accordingly, it is an object of the present invention to provide an acousto-optic coupler for glide slope control systems which monitors aircraft engine noise and which communicates signals representative thereof to landing personnel. Another object of the present invention is to provide an acousto-optic communication system for the transmission of signals indicative of aircraft engine noise between an approaching aircraft and landing facilities such as an aircraft carrier. A further object of the present invention is to instantaneously provide to a landing signal officer or similar personnel an acoustic reproduction of aircraft engine noise as experienced by the pilot guiding an approaching aircraft along a glide slope pattern. A still further object of the invention is to enable the landing signal officer or similar personnel to provide corrective commands to an approaching pilot in a glide slope pattern based on information received from the acousto-optic communication system.

Briefly, these and other objects are accomplished by an acousto-optic coupler in a glide slope control system involving the transmission of at least one modulated light beam generated by approaching aircraft landing lights and which beam is modulated according to perturbations generated by engine noise which is mechanically coupled through the airframe to the filaments of the respective landing lights. An optical receiver system positioned on board the landing facilities such as an aircraft carrier is directed to optically receive the modulated light beam from the approaching aircraft, which light beam is detected by a photodiode to produce an analog output signal which is filtered to provide an output response in the frequency band of interest. The filtered output signal is amplified and coupled to an acoustic transducer such as a loudspeaker or headphone which provides monitoring of engine noise by landing facilities personnel on an aircraft carrier.

For a better understanding of these and other aspects of the invention, reference may be made to the following detailed description taken in conjunction with the accompanying drawings.

DESCRIPTION OF THE PREFERRED EMBODIMENT

Figure 1:
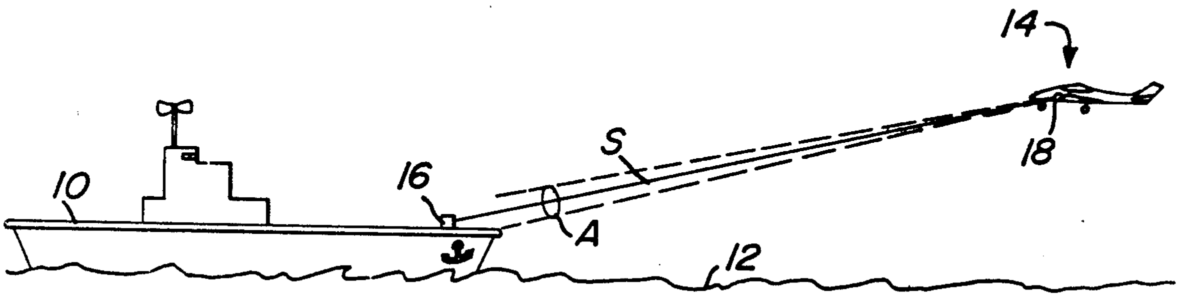
FIG. 1 illustrates the use of the present invention between an aircraft carrier and an approaching aircraft along a glide slope path.

Referring now to FIG. 1, there is shown a landing facility such as an aircraft carrier 10 positioned on a water body 12. An aircraft shown generally as 14 is approaching the carrier 10 along a glide slope S. The aircraft 14 illuminates an area forward of the aircraft and along the glide slope S by means of at least one landing light 18 attached to the airframe. An optical receiver system 16, which will be described in greater detail hereinafter, is positioned on board the carrier 10 and adapted to receive the oncoming light beam generated by the light 18 of approaching aircraft 14 within a portion of an illuminated area A denoted in the figure.

Figure 2:
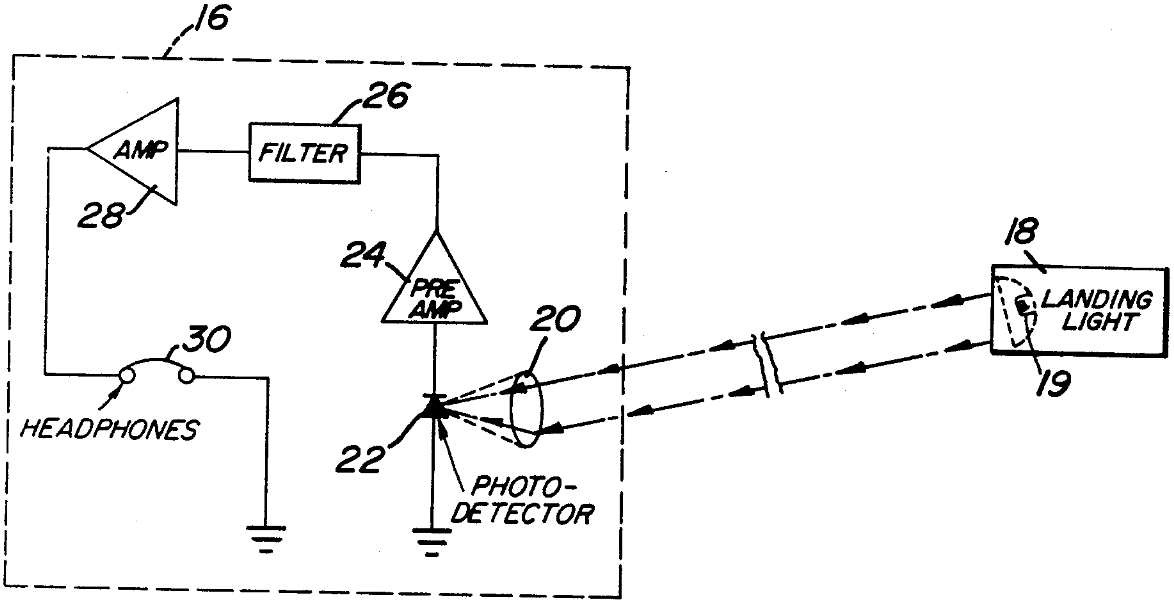
FIG. 2 is a block diagram of the present invention as utilized within the illustration of FIG. 1.

Referring now to FIG. 2, there is shown a block diagram of the present invention illustrating an aircraft landing light 18. The light 18 generates an output beam which is optically transmitted to the receiver 16 on board the carrier 10. An optical element denoted by a lens 20 is focused to receive the beam from the landing light 18. A photojunction detector 22 having a fast rise time response receives the light radiation from the lens 20 and produces an analog output signal indicative of the changes in light intensity. The analog output signal from the detector 22 is amplified by a preamp 24 and filtered by a filter 26 having a predetermined band pass. The filtered signal is connected to the input of audio amplifier 28 whose output is coupled to an acoustic transducer such as headphones 30.

Referring again to FIG. 1 in conjunction with FIG. 2, the operation of the invention will now be explained. Noise generated within the engine of the aircraft 14 is communicated along the airframe of the aircraft 14 to the landing light 18. The filament 19 within the light 18 is sensitive to the motion and vibration of the aircraft 14 and thus modulates the light beam in accordance with the engine noise produced, for example, by the rotating compressor. Typical engine noise develops over a region of approximately 800 to 1250 Hz. with a center frequency of 1000 Hz. The light 18 illuminates an area A forward of the approaching aircraft 14 while in the glide slope pattern and which illuminated area or portion thereof is sensed by the optical receiver 16 placed on board the carrier 10. One method of assisting the receiver 16 in focusing upon the light beam generated by an approaching aircraft is to mount the receiver 16 on the Fresnel lens platform of the carrier. The Fresnel lens provides, in a well known manner, a changing color pattern viewed by the approaching pilot to indicate a high, normal or low position in the glide slope path. Thus the gimbaled Fresnel lens platform is directed to continually focus on approaching aircraft and is not susceptible to changing pitch or roll in carrier position. The modulated information indicative of engine noise is transmitted by the light beam of the landing light 18 and is collected by the lens 20 in the receiver 16. The lens 20 may, for example, comprise a mirrored optical element of approximately 300 mm. focal length and an aperture speed of F1.8 to F2.3. With such a lens, the optically communicable distance between the carrier 10 and the aircraft 14 may be extended to as much as a mile. The lens 20 passes the collected light radiation to the photojunction detector 22 which, due to its fast rise time operating characteristics and while operating in a photovoltaic mode, generates as analog output signal indicative of the incoming optically modulated signal. The detector 22 will preferably comprise a planar diffused silicon photojunction diode. When operating in the photovoltaic mode as shown in FIG. 1, the only significant contribution from undesirable signal sources is thermal noise generated in the detector as contrasted with operating the detector as a biased PN junction which would have the undesirable effect of introducing dark current cathode noise as well. The detector 22 detects the changes in received light intensity and produces an analog output signal, for example, over the range of 1 to 5 mv. This output signal is then amplified by the preamp 24 which amplifies the incoming signal to an approximate one volt level. The preamp also serves to isolate the filter 26 from the detector 22, otherwise the signal bandwidth of the detector 22 may be restricted by direct connection to the filter 26. The amplified analog signal is then processed through the filter 24 having a band pass for example, of 800 Hz to 1250 Hz. indicative of the normal operating range of engine noise. The filter, of course, rejects all other undesirable signals not relevant to normally operating engine parameters and the band pass may be selectively changed so as to accommodate various aircraft engine noise frequencies. The filtered output signal is then amplified by audio amp 28 so as to provide sufficient energy to drive the headphones 30 which may alternately be a loudspeaker or similar acoustic transducer as the situation may require. The landing signal officer or similar personnel on board the carrier may then easily monitor the output of the headphones 30 so as to hear the engine noise generated by the approaching aircraft after having given a particular radio transmitted command to the pilot to correct or even abort a glide slope approach. This insures that the former communicated command has been properly interpreted and transmitted to the engine. The engine response is confirmed by an appropriate change in the level of compressor or other engine noise indicative of changing power levels. It will be appreciated that the incorporation of the acoustic signals generated by the present invention with other receiving apparatus used by the LSO may be easily accomplished by audio mixing devices well known in the art.

Thus it may be seen that there has been provided a novel acousto-optic coupler which provides a safety backup to insure the successful and accurate landing of approaching aircraft when in a glide slope pattern.

Obviously, many modifications and variations of the invention are possible in light of the above teachings. For example, the acousto-optic communications system need not be utilized exclusively for carrier operations, but may also be used in land based facilities wherein it is intended to enhance the safety of landing operations. Moreover, the preamp in the receiver may be provided with an AGC function to accommodate changing signal levels from approaching aircraft. It is therefore to be understood that within the scope of the appended claims the invention may be practiced otherwise than as specifically described.

What is claimed is:

1. An acoustic-optic coupler for enhancing safety and control of glide slope direction between an approaching aircraft and a landing facility by communication of information indicative of acoustical pitch of an operating engine mounted upon the airframe of the aircraft to a landing signal officer at the facility, in combination, comprising:

light generating means formed to be mechanically coupled to the airframe of the aircraft, said light generating means being sensitive to airframe vibrations for projecting light radiation modulated thereby, a portion of said vibrations being induced by sonic perturbations of engine; and optical receiver means formed to be mounted on the landing facility and optically connected to receive the light radiation from said light generating means for producing an acoustic output signal to the officer replicative of the acoustical pitch of the engine.

2. An acoustic-optic coupler according to claim 1 wherein said light generating means comprises at least one aircraft landing light including a filament which is sensitive to airframe vibrations.

3. An acousto-optic coupler according to claim 1 wherein said optical receiver means further comprises:

photodetecting means optically connected to receive the light radiation from said light generating means for producing an analog output signal indicative of the vibrations;

filter means connected to receive said photodetecting means output signal for producing a filtered output signal having a frequency range indicative of the acoustical pitch of the engine; and acoustic generating means connected to receive said filter means output signal for providing the acoustic output signal of said optical receiver means.

4. An acousto-optic coupler according to claim 3 wherein said photodetecting means further comprises:

means for optically collecting the light radiation from said light generating means and for focusing the collected radiation at an output;

a photojunction optically connected to receive the output radiation from said optical collection means for transforming the radiation into an analog output signal indicative of the vibrations; and amplifying means connected to receive said photojunction output signal for producing an amplified output signal representative thereof.

5. An acousto-optic coupler according to claim 4 wherein said photojunction is a silicon photodiode operating in the photovoltaic mode.

6. An acousto-optic coupler according to claim 4 wherein said acoustic generating means further comprises:

audio amplifying means connected to receive said filter means output signal for producing an amplified output signal representative thereof; and an acoustic transducer connected to receive said audio amplifying means output signal for producing said optical receiver means output signal.

7. An acousto-optic coupler according to claim 6 wherein said acoustic transducer is a headphone.

8. An acousto-optic coupler for enhancing safety and control of glide slope direction between an approaching aircraft and a landing facility by communication of information indicative of acoustical pitch of an operating engine mounted upon the airframe of the aircraft to a landing signal officer at the facility, in combination, comprising:

at least one light mechanically coupled to the airframe of the aircraft, said light including a filament sensitive to airframe vibrations for projecting light radiation modulated thereby, a portion of said vibrations being induced by sonic perturbations of the engine;

photodetecting means optically connected to receive the modulated radiation from said light for producing an analog output signal indicative of the vibrations;

a filter connected to receive said photodetecting means output signal for producing a filtered output signal having a frequency range indicative of the acoustical pitch of the engine; and acoustic transducer means connected to receive said filter output signal for providing an acoustic replica of the aircraft engine pitch.

9. An acousto-optic coupler according to claim 8 wherein said photodetecting means further comprises:

means for optically collecting the radiation from said light and for focusing the collected radiation at an output;

a photojunction optically connected to receive the output radiation from said optical collecting means for transforming the radiation into an analog output signal indicative of the vibrations; and amplifying means connected to receive said photojunction output signal for producing an amplified output signal representative thereof.

10. An acousto-optic coupler according to claim 9 wherein said photojunction is a silicon photodiode operating in the photovoltaic mode.

11. A method of assisting guidance of an approaching aircraft along a glide slope to a landing facility, comprising:

collecting a modulated light beam at the landing facility, the beam being projected from the aircraft and modulated by airframe vibrations in accordance with sonic perturbations generated by an aircraft engine;

converting the beam to an analog response indicative of the vibrations;

producing an acoustic signal from the analog response in a frequency range indicative of acoustical pitch of the engine;

generating an audible tone replicative of the acoustical pitch of the engine; and monitoring the tone by a landing signal officer to detect changes in the acoustical pitch of the engine thereby insuring proper engine response to glide slope directives of the officer.

* * * * *